United States Patent [19]
Zhang et al.

[11] Patent Number: 5,387,921
[45] Date of Patent: Feb. 7, 1995

[54] SCANNING BACK ILLUMINATING LIGHT SOURCE FOR LIQUID CRYSTAL AND OTHER DISPLAYS

[75] Inventors: Chao Zhang; Yu Feng; Shichao Ge, all of Santa Clara; Jemm Y. Liang, San Jose; Hsi-Shang Chen, Milpitas, all of Calif.

[73] Assignee: Panocorp Display Systems, Sunnyvale, Calif.

[21] Appl. No.: 52,772

[22] Filed: Apr. 26, 1993

Related U.S. Application Data

[63] Continuation-in-part of Ser. No. 993,385, Dec. 18, 1992, abandoned.

[30] Foreign Application Priority Data

Oct. 8, 1992 [CN] China .................. 9/2111255.4

[51] Int. Cl.$^6$ .................. G09G 3/36; G09G 3/28; G09G 3/00
[52] U.S. Cl. .................. 345/102; 345/5; 345/66
[58] Field of Search .................. 345/4, 5, 66, 72, 102

[56] References Cited

U.S. PATENT DOCUMENTS

| | | | |
|---|---|---|---|
| 3,783,184 | 1/1974 | Ernstoff et al. | |
| 4,510,417 | 4/1985 | Harvey . | |
| 4,872,741 | 10/1989 | Dakin et al. | |
| 4,907,862 | 3/1990 | Suntola . | |
| 4,945,281 | 7/1990 | Ipson . | |
| 5,093,652 | 3/1992 | Bull et al. | 345/102 |
| 5,121,233 | 6/1992 | Spencer et al. | 345/102 |
| 5,128,782 | 7/1992 | Wood | 345/102 |

FOREIGN PATENT DOCUMENTS

| | | |
|---|---|---|
| 60-216435 | 10/1985 | Japan . |
| WO9110223 | 7/1991 | WIPO . |
| WO9202947 | 2/1992 | WIPO . |

OTHER PUBLICATIONS

"Plasma Displays," by Larry F. Weber, Flat-Panel Displays and CRTs, ed. Lawrence E. Tannas, Jr., Van Nostrand Reinhold, pp. 332-415, New York 1985.

"Retroreflecting sheet Polarizer," by M. F. Weber, SID 92 Digest, pp. 427-429.

"Gas Discharge Displays: A Critical Review," b R. N. Jackson and K. E. Johnson, *Advances in Electronics and Electron Physics*, 35:191-267.

"Development and Production of a Flat Fluorescent Lamp for LCD Backlighting," by Coleman et al., SID 92 Digests, pp. 430-432.

*Primary Examiner*—Jeffery Brier
*Attorney, Agent, or Firm*—Majestic, Parsons, Siebert & Hsue

[57] ABSTRACT

A scanning flat back light source for use with light valve devices such as liquid crystal displays. It is formed by an array of parallel fluorescent tubes with fluorescent layers therein. One end of each tube is provided with an electrode and the other end connected together through a transverse chamber to form a single vacuum unit. When electrical potential is applied across electrodes in two different chambers, the two chambers and the portion of the transverse chamber connecting the two chambers form a fluorescent lamp where gas discharge produces ultraviolet light that causes a fluorescent layer on the inside walls of the tubes to produce single-color or multi-color light. During successive time intervals in the scanning operation, at least one of the tubes which are caused to emit light during one time interval is also causes to emit light during a subsequent time interval so that the charged particles present in such overlapping tube accelerate the gas discharge process during the subsequent time interval. This device is particularly suitable for portable devices such as portable computers and has high brightness and efficiency without excessive power consumption.

37 Claims, 7 Drawing Sheets

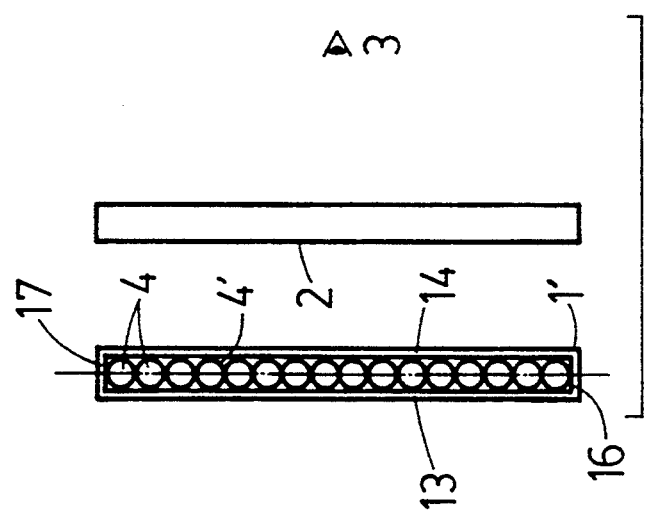
FIG._1B.
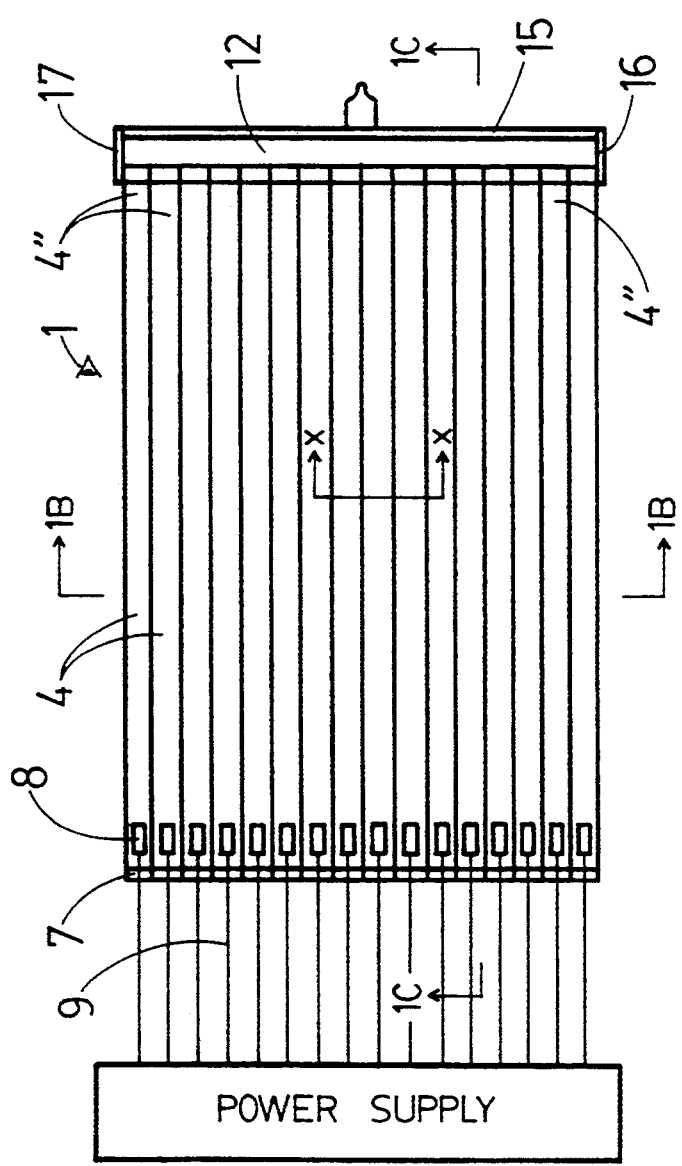
FIG._1A.
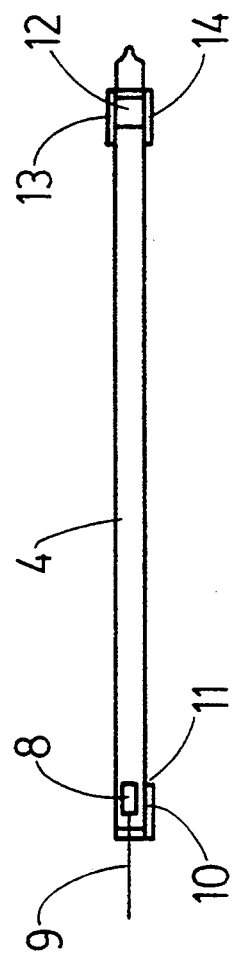
FIG._1C.

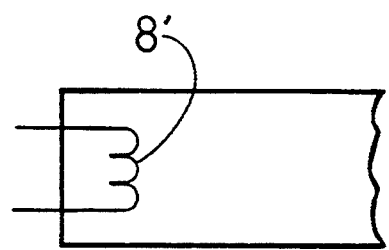
FIG._1D.
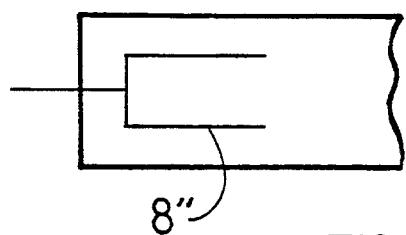
FIG._1E.
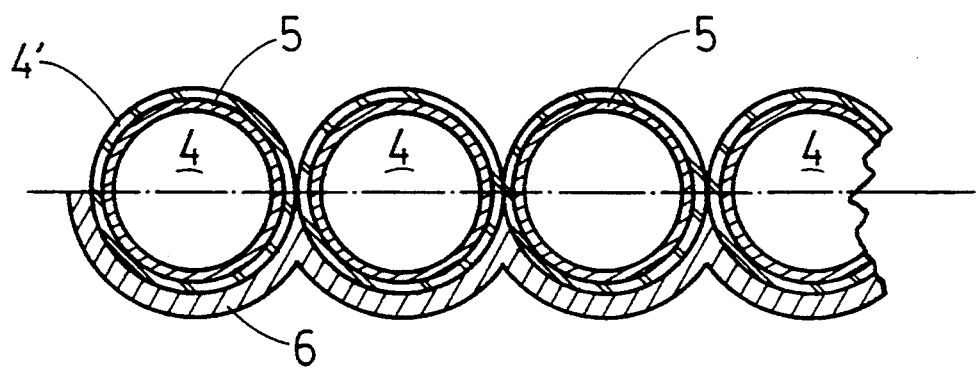
FIG._2.
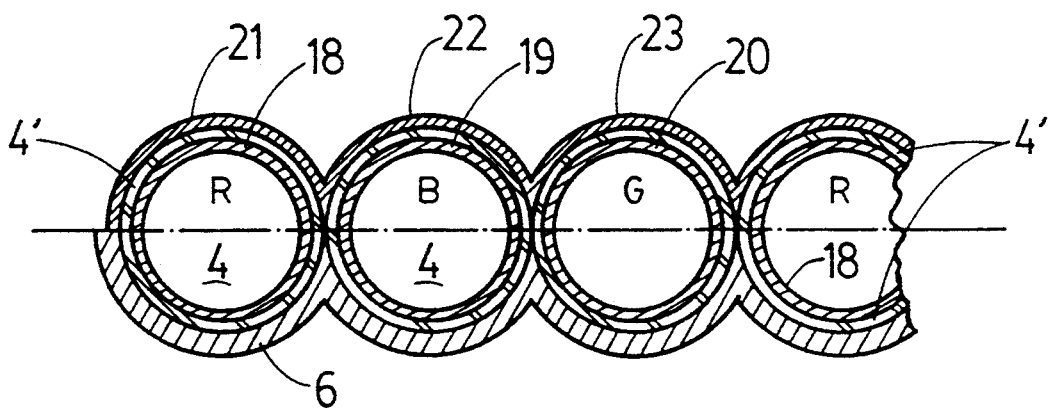
FIG._3.

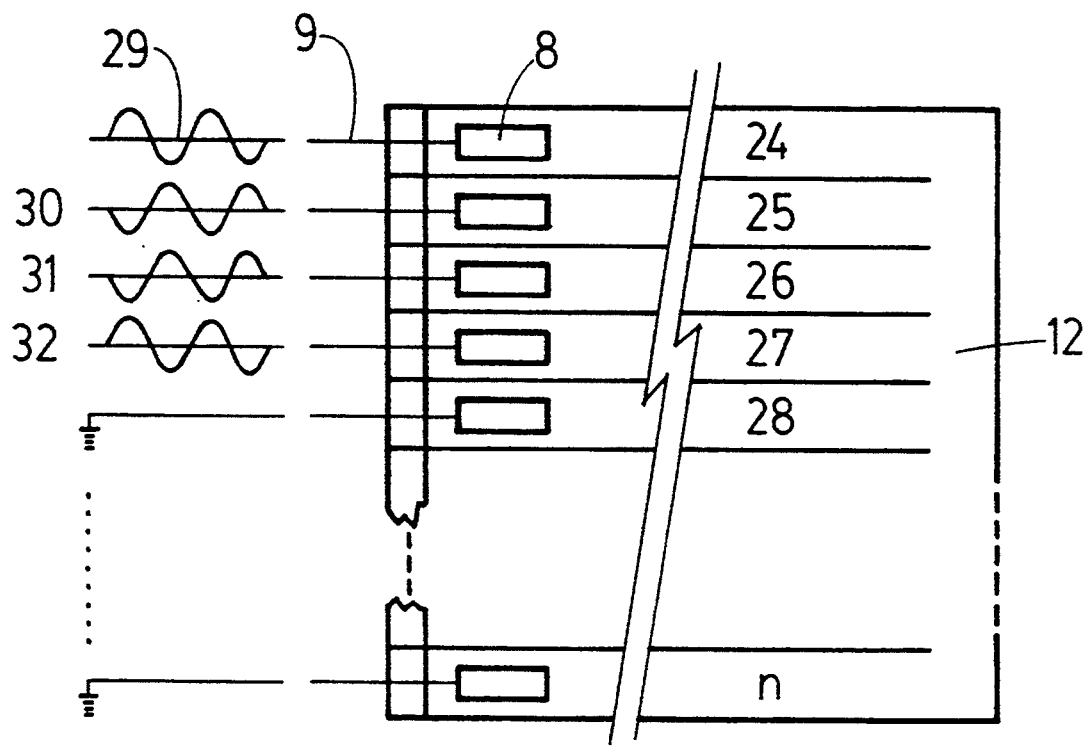
FIG._4A.
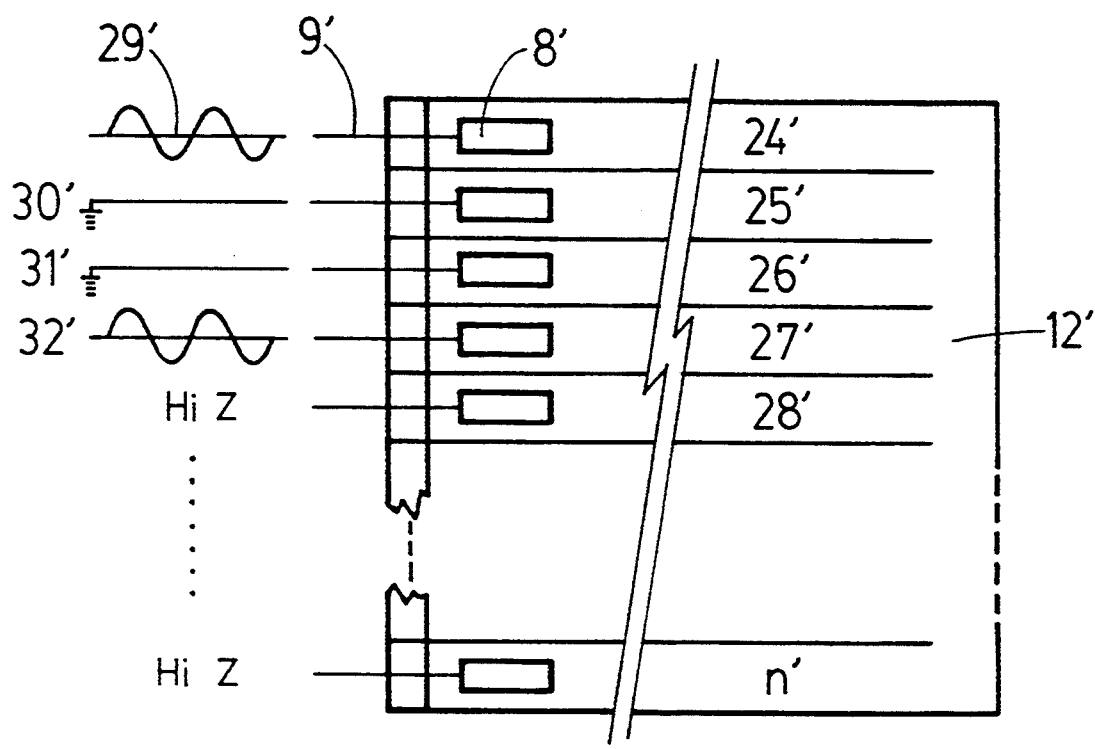
FIG._4B.

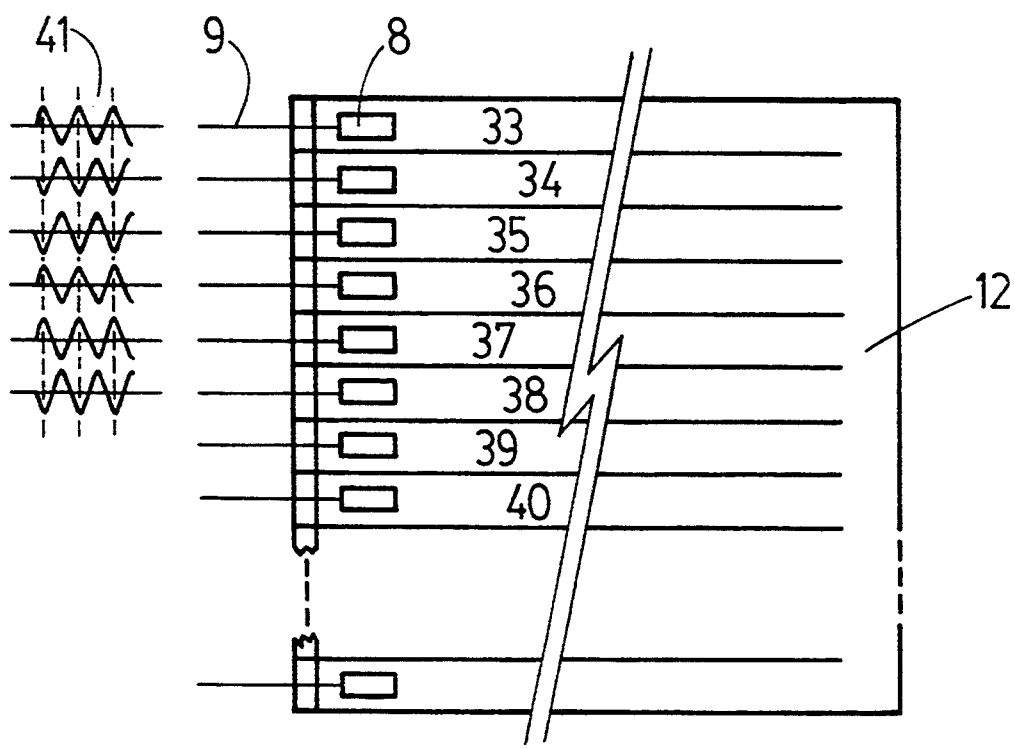
FIG._5.
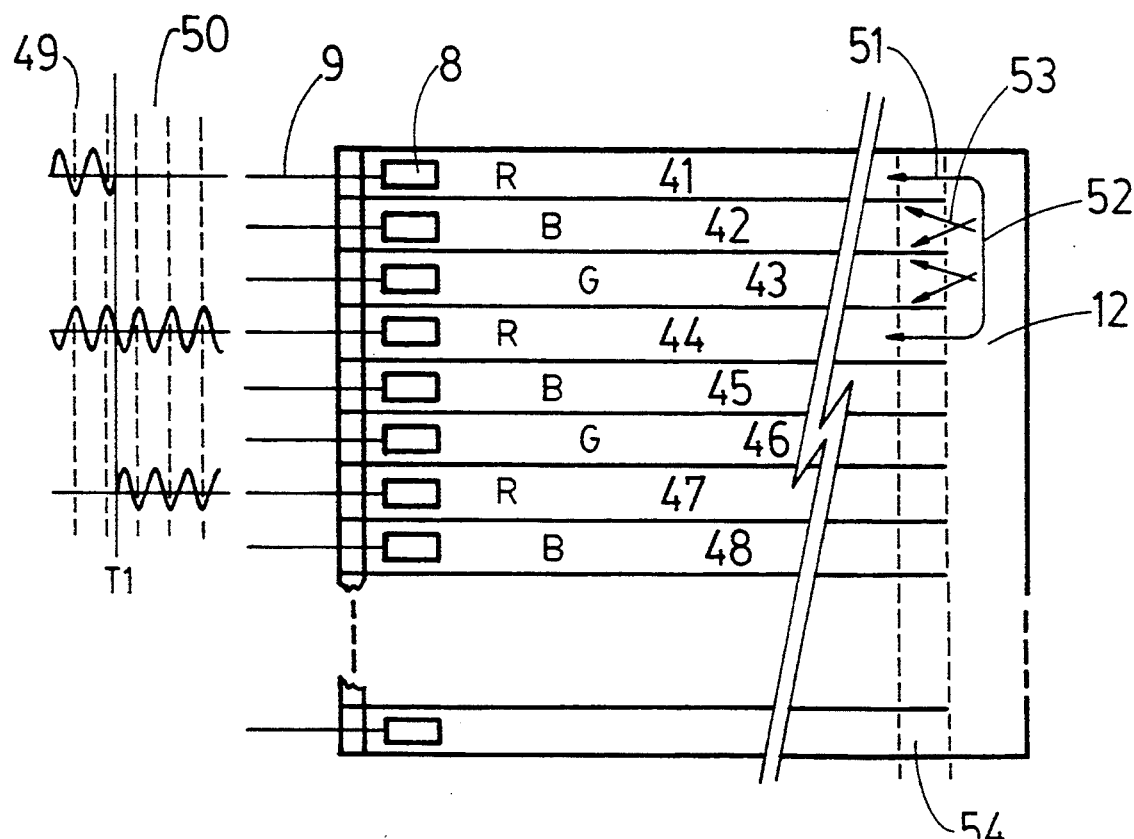
FIG._6.

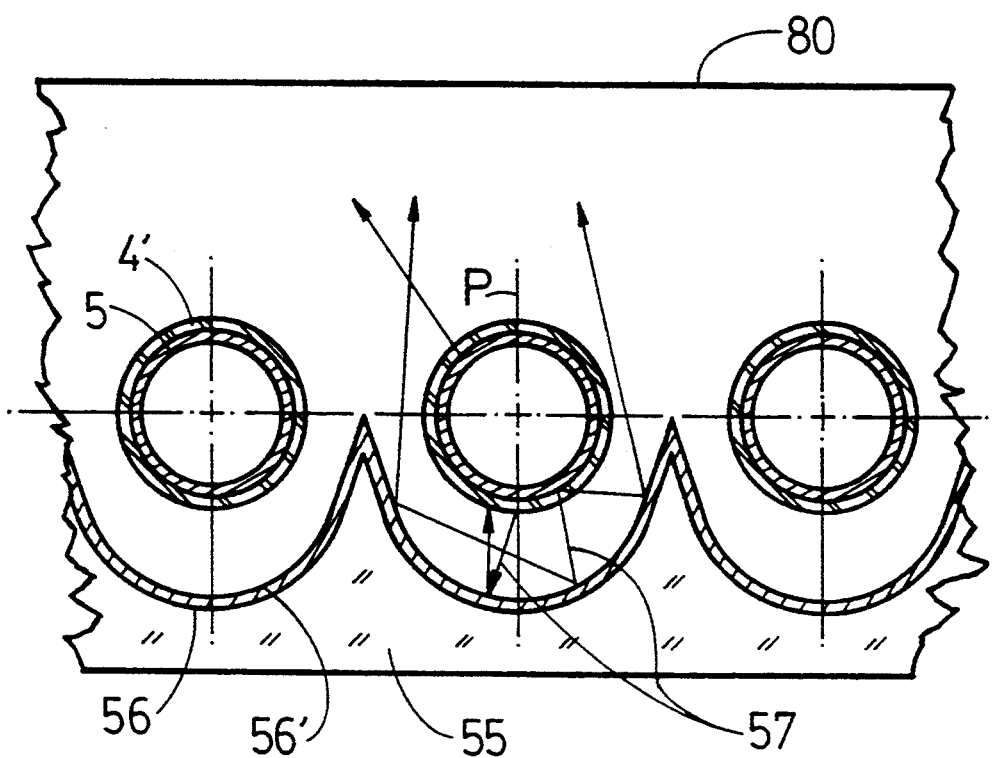
FIG._7.
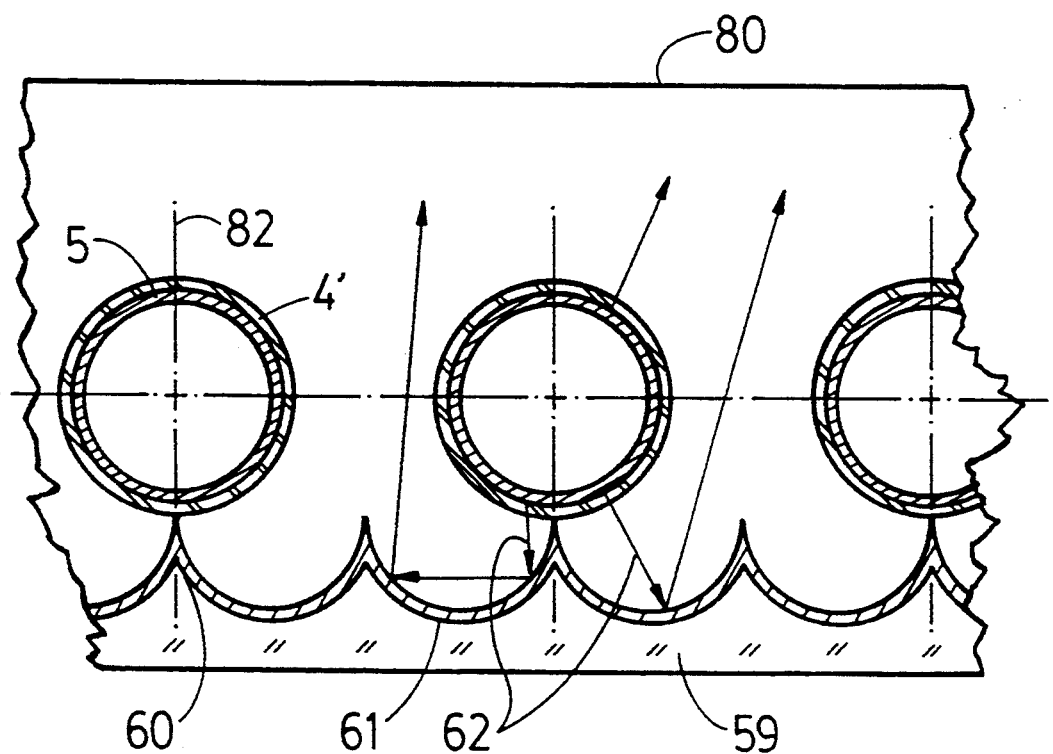
FIG._8.

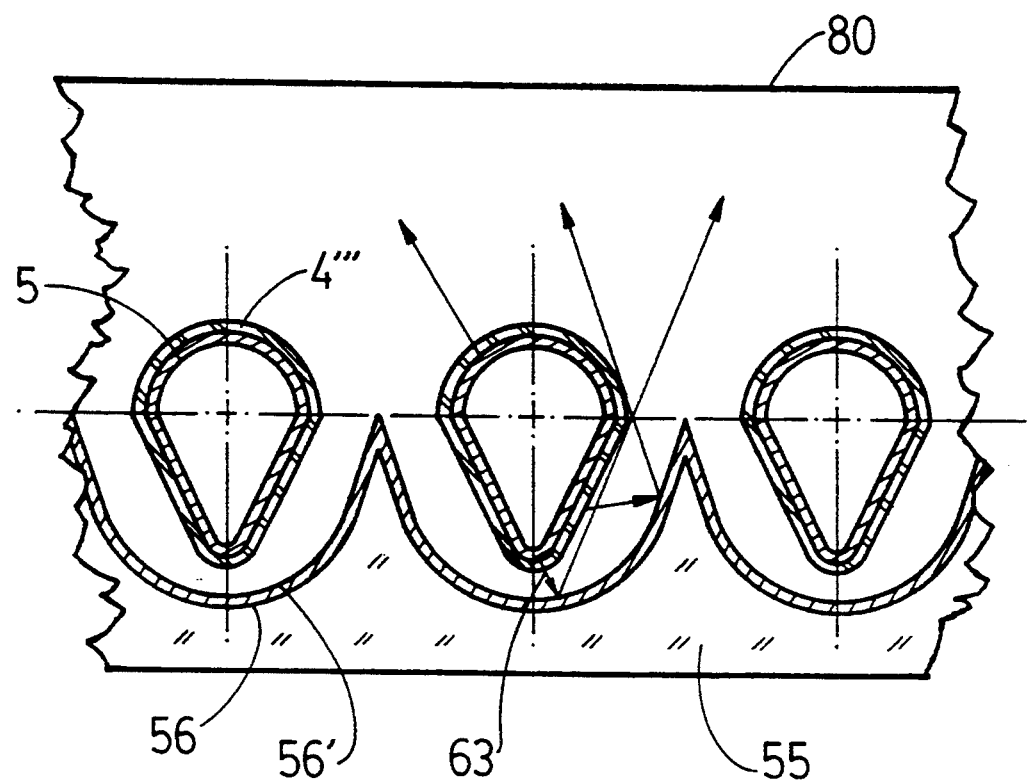
FIG._9.
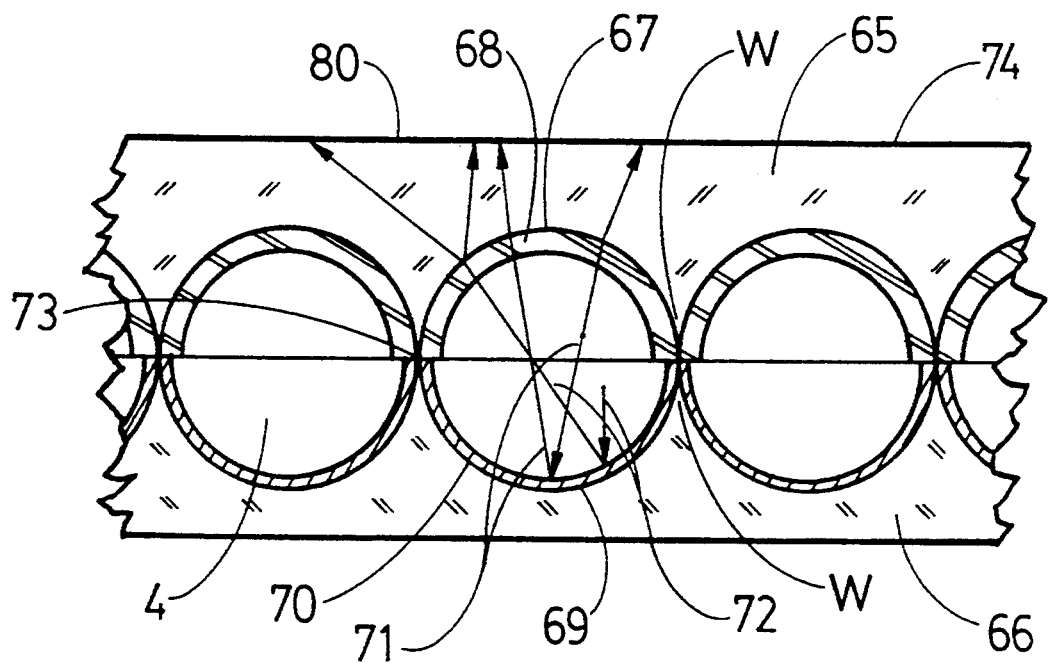
FIG._10A.

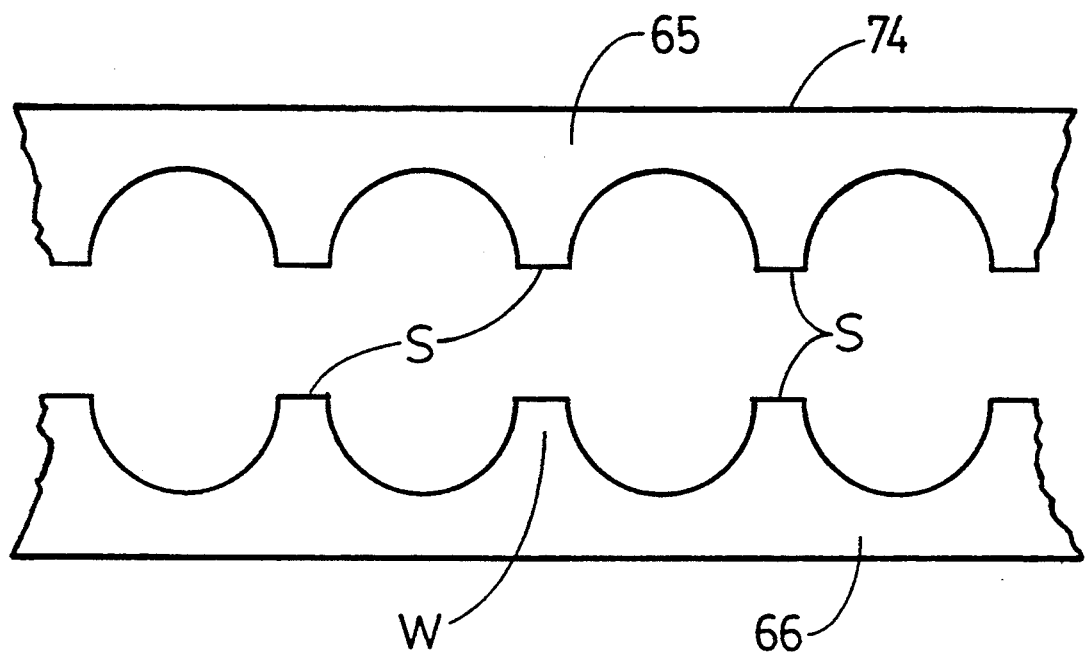
FIG._10B.
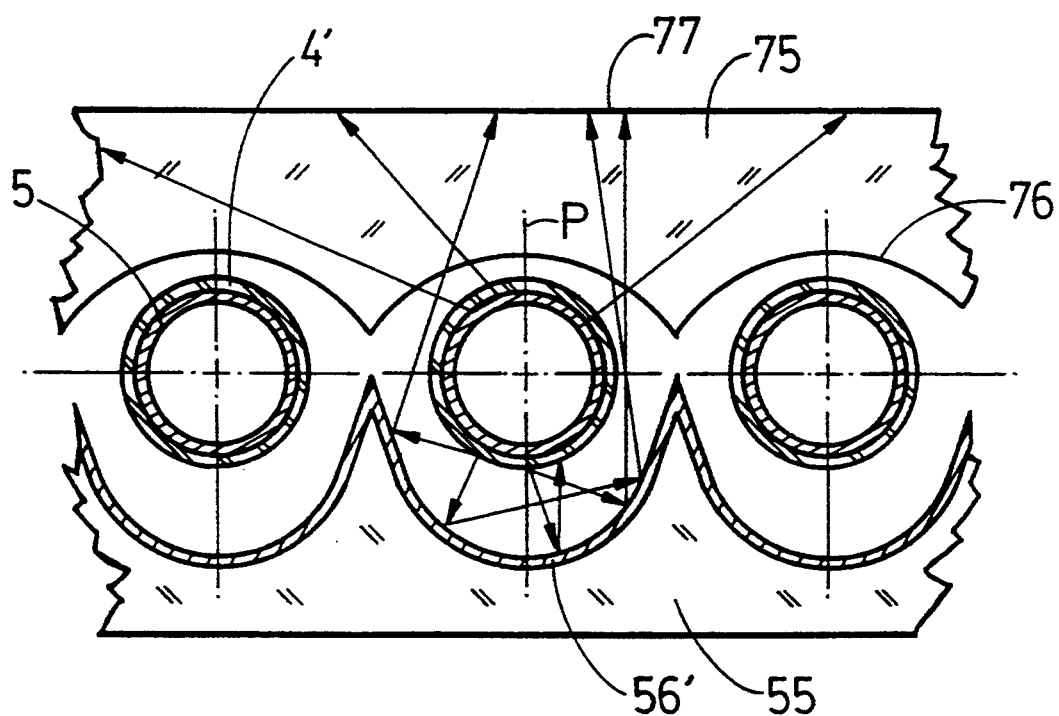
FIG._11.

SCANNING BACK ILLUMINATING LIGHT SOURCE FOR LIQUID CRYSTAL AND OTHER DISPLAYS

CROSS-REFERENCED RELATED APPLICATIONS

This application claims priority based on an application filed Oct. 8, 1992 in the People's Republic of China, Serial No. 92111225.4. This application is also a continuation-in-part application of U.S. Ser. No. 993,385 filed Dec. 18, 1992, entitled "DISPLAY DEVICE" hereinafter referred to as "parent application" now abandoned.

BACKGROUND OF THE INVENTION

This invention relates to displays using light valves such as liquid crystal displays (LCDs), and in particular to a scanning back light source for use with LCDs and other displays using light valves.

LCDs are one of the most widely used display devices. In most of the multi-color and full-color LCDs proposed, a back light source is employed. As explained in more detail in the priority application, Chinese Application Serial No. 92111225.4 referenced above, conventional back light sources are plagued by many problems including low illumination intensity, inadequate color, and high power consumption. The above problems are particularly acute for LCDs used in battery driven devices.

To overcome the above-described disadvantages of conventional systems, the above-referenced Chinese priority application proposed a flat light source where light emission can be provided in a scanning operation for illuminating LCDs. The light source proposed provides light of uniform and adequate intensity that is adjustable. No red, green and blue filters are required so that the LCD system is much more efficient in utilizing light provided by the back light source. The proposed light source has high efficiency and enables high resolution LCD displays and may be cheaper to manufacture than many conventional systems.

In the back light source proposed by the priority Chinese application, priming particles may escape from one gas discharge channel through a hole to an adjacent gas discharge channel. The presence of such priming particles in the next gas-discharge channel that is to be scanned accelerates the gas discharge process in such next channel and speeds up the scanning operation.

An object of the present application is to provide an improved back light source and an improved scanning method that enable higher scanning speed and reliability in a light source that is easy to manufacture.

SUMMARY OF THE INVENTION

One aspect of the invention is directed towards a back light source for use with light valve display comprising a plate defining therein an array of substantially parallel elongated gas-discharge chambers, each having an end, and defining therein a transverse chamber, wherein the end of each chamber is connected to the ends of the other chambers through the transverse chamber. The back light source also includes a gas in the chambers, an electrode in each chamber in the array spaced apart from the first end of such chamber, and means for applying electrical potentials to the electrodes in sets of chambers during a plurality of consecutive timed intervals in a sequential scanning operation. Each set of chambers includes at least two chambers. The potentials are applied by the applying means to electrodes in a set of a plurality of chambers during each time interval. Each potential is applied across the electrodes in two chambers in a set to cause gas discharge in the two chambers and in a portion of the transverse chamber connecting the two chambers so as to cause light emission from the two chambers. The applying means is such that during at least two consecutive time intervals, the two sets of chambers to which electrical potentials are applied overlap by at least one chamber, so that ionized particles generated during the earlier of the two consecutive intervals in the at least one overlapping chamber accelerates gas discharge during the later of the two consecutive time intervals.

In the above-described back light source, since ionized particles generated during the earlier of the two consecutive intervals in the at least one overlapping chamber are still present in the overlapping chamber during the later of the two consecutive timed intervals, gas discharge in the overlapping chamber as well as other chambers connected to the overlapping chamber through the transverse chamber is accelerated. This feature enables high speed scanning operation of the back light source.

In the preferred embodiment, the chambers in the array are enclosed by fluorescent layers which emit visible light in response to ultraviolet light. The gas in the chambers are such that it emits visible or ultraviolet light in response to adequate electrical potential between electrodes in the chambers. Also in the preferred embodiment, the above-referenced plate includes a diffuser layer facing the light valve display where the diffuser layer may have a diffuser lens. The plate also has a reflective layer having a wavy surface facing the chambers and the light valve display for reflecting light traveling away from the display towards the display. The preferred embodiment of the invention includes the following features:

(a) The plate comprises an array of glass tubes, wherein each of the chambers is defined by and enclosed within a tube;
(b) On the inside surface of the glass tubes are layers of fluorescent material which may be in the form of a powder or thin film;
(c) The cathode at the end of each tube is a cold cathode;
(d) The gas in the chambers is a mixture of mercury vapor and one or more inert gases;
(e) The diffuser layer of the plate is made of a transparent plastic and has diffuser surfaces on both sides of the layer, where the diffuser layer has a surface facing the chambers having a plurality of parallel grooves;
(f) The plate comprises a reflector layer facing the chambers, where the reflector layer has a surface facing the chambers having a plurality of parallel grooves, where the number of grooves is twice that of the number of glass tubes and where the grooves are coated with an aluminum metal layer;
(g) The means or device for applying electrical potentials to the electrodes and the structure of the plate permit high speed scanning operation in the back light source. Thus, if the plate includes n glass tubes, during a plurality of scanning time intervals, during the first scanning time interval, an electrical potential is applied between the electrodes in the first and second of the n glass tubes, thereby causing gas discharge in the first and second glass tubes and light emission from the two tubes. During the second scanning time interval, the means or device for applying electrical potentials applies an electrical potential between the electrodes in the second and third glass tubes, causing the second and third glass tubes to emit light. During the third scanning time interval, electrical potential is applied to electrodes in the third and fourth glass tubes, causing them to emit light and so on until during the last scanning time interval in a complete cycle, electrical potential is applied between the electrodes in the n tube and the first tube, causing them to emit light. Then this complete cycle is repeated. During each scanning time interval except the first interval of the first cycle, since gas discharge will take place in one tube in which gas discharge also took place in the previous time interval, such tube will include a large number of charged particles left over from the previous gas discharge. This accelerates gas discharge during every scanning time interval, except the very first time interval upon system initiation, in both glass tubes, for emitting single color or multi-color light.

(h) The fluorescent layers on the inside surface of the tubes emit light in one of three colors: red, green and blue. The layers that emit red, green and blue light are arranged alternately so that a tube that emits red light is adjacent to a tube that emits blue light and another tube that emits green light;

(i) For multi-color display, the plate includes m tubes for emitting red light, m tubes for emitting green light, and m tubes for emitting blue light, arranged alternately such as where the first, fourth, seventh, tenth, . . . , (3m-2) tubes emit red light; the second, fifth, eighth, eleventh, . . . , (3m-1) tubes emit green light; and the third, sixth, ninth, twelfth, . . . , (3m) tubes emit blue light. During operation, electrical potential is applied between an electrode in a tube and an electrode in the closest tube that emits light of the same color. For example, during the first of a sequence of consecutive scanning time intervals, electrical potential is first applied between the first and fourth tubes, causing these two tubes to emit red light; during the second time interval in the sequence of consecutive time intervals, electrical potential is applied betwen electrodes in the fourth and seventh tubes, causing these two tubes to emit red light and during the third time interval, the seventh and eleventh tubes are similarly caused to emit red light and so on. During the last scanning time interval in the sequence, the (3m-2)th tube and the first tube are caused to emit red light. Such sequence may be repeated during the scanning operation.

Instead of repeating the generation of red light for another sequence of consecutive time intervals, for a multi-color display, the next sequence or cycle would cause the second, fifth, eighth, eleventh, . . . , (3m-1)th tubes to emit green light and during the third sequence or cycle causing the third, sixth, ninth, twelfth, . . . , (3m)th tubes to emit blue light. Then all three sequences or cycles may be again repeated in the manner described above for a continuous multi-color display.

BRIEF DESCRIPTION OF THE DRAWINGS

FIG. 1A is a top view of a back light source suitable for use with a light valve device to display monochromatic or multi-color images.

FIG. 1B is a cross-sectional view of one embodiment of plate 1 of the back light source of FIG. 1A, taken along the line 1B—1B in FIG. 1A, and also of a light valve device 2 used in conjunction with a back light source for displaying images and an observer 3 observing the images;

FIG. 1C is a cross-sectional view of the back light source of FIG. 1A, taken along the line 1C—1C in FIG. 1A;

FIGS. 1D, 1E are schematic views of electrodes which may be used in the back light source of FIGS. 1A, 1C;

FIGS. 2 and 3 are enlarged cross-sectional views of a plate illustrating two different constructions of a portion of, the plate 1' of FIG. 1B;

FIGS. 4A, 4B, 5, 6 are schematic views of a back light source and electrical potentials applied to the electrodes of the source to illustrate the invention; and FIGS. 7-9, 10A, 11 are five enlarged cross-sectional views illustrating five different constructions of a portion of the plate 1 in FIG. 1A to illustrate the invention. FIG. 10B is an enlarged and exploded view of the plate of FIG. 10A.

For convenience in description, identical elements in the figures of this application are labelled by the same numerals.

DETAILED DESCRIPTION OF THE PREFERRED EMBODIMENT

FIG. 1A is a top view of a back light source for use with a light valve front end unit (not shown) to illustrate the invention, where the source includes a plate 1 connected to and powered by a power supply. Plate 1 encloses and defines therein an array of parallel channels or chambers 4 that are elongated and have ends 4". In the embodiment of FIG. 1B, chambers 4 are defined by and enclosed within transparent tubes such as glass tubes with circular or elliptical (not shown) cross-sections. As will be illustrated later, the chambers 4 of FIG. 1A may also be formed and defined differently from that shown in FIG. 1B without using transparent tubes. All such variations are within the scope of the invention.

FIG. 1B is one implementation of plate 1, shown a cross-sectional view of the plate taken along the line 1B—1B in FIG. 1A. In addition, FIG. 1B also shows a light valve device (such as LCD) 2 and an observer 3. Light emitted from plate 1 passes through the light valve device 2 to display images which are observed by an observer 3. FIG. 1C is a cross-sectional view of plate 1 of FIG. 1A taken along the line 1C—1C in FIG. 1A.

One end of the elongated channels or chambers 4 are sealed by glass 7 and houses a hot or cold cathode 8 connected to a power supply through wires 9. A hot cathode 8' together with a wire connected to a power supply (not shown) for heating the cathode are illustrated in FIG. 1D and cold cathode 8" is illustrated in FIG. 1E. As shown in FIG. 1C, where the chambers 4 in plate 1 are defined by a number of tubes 4' of the type shown in FIG. 1B, the sealed ends of the tubes are attached and fixed onto a planar surface defined by plate 10 by means of high temperature adhesive or low melting point glass 11. The other end 4" of the parallel chambers 4 communicate with each other through a transverse chamber 12 formed by top and bottom plates 13, 14 and side plates 15, 16 and 17, where the plate 13-17 are attached to the ends 4'' of the channels by means of low melting point glass powder, forming a transverse chamber 12 with a quadrilateral cross-section. It is understood that the cross-section of chamber 12 may take on other shapes, such as that of a half cylinder; all such variations are within the scope of the invention. The array of chambers 4 and the transverse chambers 12 form a single vacuum system. After being evacuated, these chambers are filled with a gas which would discharge when an electrical potential is applied. One suitable gas that may be used is a mixture of mercury vapor and an inert gas such as argon or neon under a predetermined pressure known to those skilled in the art. When bombarded by priming particles under the influence of an electrical potential applied across two or more electrodes in different chambers 4 where the potential exceeds a certain threshold known to those skilled in the art, electrons emitted by the hot or cold cathodes will bombard the gas particles in the chambers and cause them to ionize, whereby the ionized gas causes a discharge in the chambers. The gas discharge emits ultraviolet light which excites the fluorescent layers surrounding the chambers and cause the layers to emit single color (e.g., white) or multi-color light, such as red, green and blue light, depending on the kind of phosphor present on the walls of the chambers.

FIG. 2 is a cross-sectional view illustrating one embodiment for a portion of the plate 1' in FIG. 1B where the fluorescent layers 5 on the inside surfaces of the tubes 4' emit light of a single color, such as white light. If the light generated by the gas discharge itself can be used directly for vacuum illumination, then layers 5 may be eliminated. On the back sides of the cylindrical or elliptical glass tubes 4' are one or more light reflective layers 6 which reflect light generated either by the gas discharge or by the layers 5 towards the light valve device 2 (not shown in FIG. 2) for image display.

FIG. 3 is an enlarged cross-sectional view illustrating another embodiment of a portion of plate 1' in FIG. 1B suitable for generating multi-color images. As shown in FIG. 3, the cylindrical or elliptical tubes 4' are coated on the inside surface by one of three types of fluorescent layers 18, 19 and 20. Layers 18, 19 and 20 generate respectively red, blue and green light in response to the incidence of ultraviolet light. As shown in FIG. 3, the fluorescent layers 18, 19 and 20 may be used to coat the inside surfaces of consecutive tubes in the array of tubes 4', so that if there are 3m tubes 4' arranged in an array shown in FIGS. 1B and 3, a first subsequence formed by the first, fourth, seventh, . . . , (3m-2)th tubes have layers 18 on their inside surfaces; a second subsequence formed by the second, fifth, eighth, . . . , 3m-1)th tubes in the array have layers 19 on their inside surfaces; and a third subsequence formed by the third, sixth, ninth, . . . , (3m) th tubes have layers 20 on their inside surfaces. In such manner, gas discharge in the chambers 4 would generate visible or ultraviolet light which in turn causes the layers 18, 19, 20 to generate red, blue and green light. When the power supply of FIG. 1A applies electrical potentials to electrodes in a set of chambers, this operation defines a scanning of the chambers and will be reffered to below as such. In one embodiment, all of the chambers in one subsequence are scanned successively in a subcycle before chambers in another subsequence are scanned in a subsequent subcycle.

To improve the color purity of the light generated, filter layers 21, 22 and 23 are employed on the outside surface of tubes 4' but only on the side facing the light valve device 2 (not shown in FIG. 3). Layers 21, 22 and 23 will filter out light in other wavelengths except for respectively light in the red, blue and green wavelength ranges. These filter layers may also be capable of filtering out ultraviolet light that may escape through the fluorescent layers, so that the ultraviolet light would not adversely affect the light valve device.

In order to achieve high color purity or to change the color coordinates, it is also possible to replace purely transparent glass tubes 4' with red, blue and green colored glass tubes; in such event, the filter layers 21-23 may be eliminated.

FIGS. 4A, 4B are schematic views of plate 1 of the back light source of FIG. 1A and wave forms 29-32, 29'-32' of electrical potentials applied to the electrodes 8, 8' respectively for causing gas discharges to illustrate two different driving methods of the invention. In reference to FIG. 4A, during the first time interval of a sequence of consecutive time intervals of a scanning cycle, an electrical potential is applied between electrodes 8 in chambers 24 and 25. To accelerate the initiation of gas discharge during the very first time interval of the first scanning cycle, additional electrodes and electrical potentials applied thereto (not shown in FIG. 4A) may be employed in chamber 24. After gas discharge in chambers 24 and 25 has initiated, these two chambers then contain a large number of charged particles. During the second time interval after the first time interval in the sequence of consecutive time intervals in the first scanning cycle, an electrical potential is applied between the electrodes 8 in chambers 25 and 26. Since the second time interval follows immediately after the conclusion of the first, at the beginning of the second time interval, a large number of charged particles present during the first time interval in chamber 25 would still be present. For this reason, gas discharge in chambers 25 and 26 would be quickly initiated even though there may be few charged particles in chamber 26 at the beginning of the second time interval. In the same vein, during the third time interval, an electrical potential is applied between the electrodes in chambers 26 and 27 and so on until in the last time interval in the first scanning cycle, an electrical potential is applied between the electrodes in chambers n and 24. At this point, the entire cycle may be repeated in the manner described.

In the above-described operation, every two chambers to which electrical potential is applied defines a single lamp, and during each time interval in the scanning cycle each lamp is caused to emit light. In order to increase the brightness of the back light source, it is possible to cause more than two chambers to emit light at the same time. For example, it is possible to cause the two lamps formed by the two chambers 24, 25 and 26, 27 to emit light during the first time interval, and during the second time interval cause the lamp formed by chambers 25, 26 and the chamber formed by the chambers 27, 28 to emit light and so on.

Since all the chambers are connected at one end through the transverse chamber 12, there may be crosstalk between adjacent chambers, which affects the uniformity of light emission. For example, when the lamp formed by the chambers 24, 25 and the lamp formed by chambers 26, 27 are caused to emit light, depending on the electrical potential applied to the electrodes in the four chambers, in addition to the gas discharge between electrodes in chambers 24 and 25, there may also be gas discharge between electrodes in chambers 26 and 25 as well, which causes crosstalk. To reduce such crosstalk, the electrodes in chambers 25 and 26 are caused to be at essentially the same electrical potential. In general, the electrical potentials are applied so that the two electrodes in the pair of chambers forming the lamp would be at different electrical potentials so as to enable gas discharge to occur between such two electrodes, whereas electrodes in adjacent chambers but belonging to different lamps (pairs of chambers) are at the same electrical potential. As illustrated in FIG. 4A, if AC electrical potentials are applied to the electrodes in chambers 24–27, to achieve the above-described result, electrical potentials 30, 31 applied to the electrodes in chambers 25 and 26 are in phase to prevent gas discharge between electrodes in these chambers. The two pairs of electrical potentials 29, 30 and 31, 32 are, however, at opposite phases to enable gas discharge to occur between the electrodes in chambers 24 and 25, and between the electrodes in chambers 26 and 27. The AC electrical potentials applied may be square waves, sine waves, or assume other types of wave forms. As shown in FIG. 4A, the remaining electrodes in chambers 28, . . . , n are connected to ground, while potentials with the waveforms 29–32 are applied to electrodes in chambers 24–27.

In order to reduce crosstalk, it is also possible to connect electrodes in chambers 25', 26' to a fixed reference voltage such as ground and apply essentially the same AC signal to the electrodes in chambers 24' and 27' as shown in FIG. 4B as a variation of the scheme of the method ilustrated with respect to FIG. 4A. It is also possible to connect the electrodes in chambers 24' and 27' to ground but apply the same AC electrical potential to the electrodes in chambers 25', 26'. It will be noted that, in all of the above schemes, the number of chambers which are caused to emit light are even numbers. The above-described scheme may also be applied to where more than four chambers are caused to emit light at the same time, such as when all the chambers are caused to emit light simultaneously. As shown in FIG. 4B, while potentials with waveforms 29', 32' are applied to electrodes in chambers 24', 27', and electrodes in chambers 25', 26' are grounded, the electrodes in the remaining chambers 28', . . . , n may be left floating, or at high impedance. In other words, three types of inputs (AC potential, ground or fixed potential or high impedance) may be used for controlling the electrodes.

FIG. 5 is a schematic view of the plate 1 of FIG. 1A and wave forms 41 of electrical potentials applied to electrodes of plates 1 to illustrate another scanning method for operating the back light source of this invention. As shown in FIG. 5, during the first time interval of a sequence of consecutive time intervals in the complete scanning cycle, electrical potentials 41 are applied to the electrodes 8 in chambers 33–38 where chambers 33, 34 form the first lamp, chambers 35, 36 form the second lamp, and chambers 37, 38 form the third lamp. During the second time interval of the sequence, the wave forms 41 are shifted spatially by one chamber downwards so that the top two wave forms are applied respectively to electrodes in chambers 34, 35 which make up the first lamp, the next two wave forms are applied respectively to the electrodes in chambers 36, 37 and the bottom two wave forms applied respectively to the electrodes in chambers 38, 39 which make up the third lamp. The above-described process is then repeated until, during the last time interval of the cycle, the electrical potentials with wave forms 41 are applied to electrodes in the last chamber of the array and in chambers 33–37. In other words, during each time interval, the chambers which are caused to emit light are shifted by one downwards where AC wave forms of the opposite phase are applied to electrodes in the first lamp, the second lamp, and the third lamp. The same AC potential is applied to electrodes in adjacent chambers of different lamps to avoid crosstalk. As in the embodiment of FIG. 4A, the set of six electrodes which are caused to have gas discharge therein overlap the set of six electrodes during the next time interval by five chambers, so that the presence of large numbers of charged particles in the overlapping chambers during the later time interval accelerate gas discharge during such time interval to speed up the scanning operation.

FIG. 6 is a schematic view of plate 1 of FIG. 1A and wave forms 49, 50 to illustrate a scanning operation for multi-color display. As shown in FIG. 6, chambers 41, 44, 47, . . . , are caused to emit red light when gas discharge occurs therein through fluorescence of a fluorescent layer surrounding such chambers. Similarly, chambers 42, 45, 48, . . . are caused by gas discharge to emit blue light and chambers 43, 46, . . . , are caused to emit green light by gas discharge. The scanning cycle is such that during the first one-third cycle or the first subcycle, only red light is generated; during the second third of the cycle or the second subcycle, only blue light is generated; and during the last third of the cycle or the third subcycle, only green light is generated. During the first third of the cycle, during the first time interval of such third cycle, electrical potentials are applied across the electrodes in chambers 41, 44. AC potentials 49 of the opposite phase are applied to the electrodes in chambers 41 and 44 respectively, thereby causing a gas discharge in the two chambers through a portion of the transverse chamber 12 along path 52, thereby causing the two chambers to emit red light. The first time interval ends at time T1 which also marks the beginning of the second time interval in the first third of the cycle. At time T1, AC potentials 50 of the opposite phase are applied to electrodes in chambers 44, 47 as shown in FIG. 6, thereby again causing gas discharge through the two chambers as well as a portion of the transverse chambers 12 connecting these two chambers, and thereby causing chambers 44, 47 to emit red light. This operation is then repeated by shifting the two potentials applied spatially downwards by three electrodes (or the electrode in the closest chamber in the downstream direction that emits the same color light) for every time interval during the first third of the cycle until at the last time interval during such first third of the cycle, the third from the last chamber in the array and chamber 41 are caused to emit red light. In the above-described process, when electrical potentials are applied to electrodes in two of the chambers, the electrodes in the remaining chambers are connected to a reference fixed potential such as ground.

As known to those skilled in the art, gas discharge will occur only when electric field in a chamber exceeds a certain value. The AC potentials of opposite phases applied are such that the electric field in the chambers (e.g. in chambers 41, 44) to which such potentials are applied just exceeds such threshold. Therefore, even though there is also a potential difference between the electrodes in chambers 41 and 42, for example, such potential is inadequate to cause gas discharge between chambers 41 and 42, since the potential difference between these two chambers is only half that between chambers 41 and 44.

As shown in FIG. 6, when gas discharge is occurring in chambers 41, 44 and the portion of transverse chamber 12 connecting these two chambers through path 52, the ultraviolet light generated in this portion of transverse chamber 12 may travel along paths such as paths 53 in FIG. 6 to become incident on the walls of chambers 42 and 43, causing the emission of blue and green light at the end portions 51 of chambers 42, 43. To reduce such crosstalk, the cross-sectional dimensions of the portion of transverse chamber 12 connecting chambers 41 and 44 may be made larger than the cross-sectional dimensions of the chambers (e.g. 41-48, . . .) in the parallel array. This reduces the density of charged particles in the portion of transverse chamber 12 connecting chambers 41 and 44, thereby reducing the amount of ultraviolet light or visible light generated by the gas discharge therein.

To further reduce crosstalk, one may simply not surround the end portions 54 (shown between dotted lines in FIG. 6) of the chambers with fluorescent material so that such portions would not generate light in response to ultraviolet or visible radiation originating from transverse chamber 12. The surfaces of such portions 54 may be covered by an opaque layer to further reduce crosstalk.

In the embodiment of FIG. 2, the fluorescent layers 5 absorb much of the light reflected by reflective layers 6. Furthermore, the light reflected by reflective layers 6 must penetrate two fluorescent layers 5 before such reflected light can emerge from the back light source to become incident upon the light valve device. Therefore, much of the light reflected by layers 6 are absorbed; this reduces the efficiency of the back light source. The following solutions overcome such shortcoming:

1. FIG. 7 is a cross-sectional view of a portion of plate 1 of FIG. 1A taken along the line X—X to illustrate a different construction of the plate. As in FIG. 2, plate 1 includes tubes 4' coated with fluorescent layers 5 therein. Aside from the differences pointed out below, the remaining features of the construction of FIG. 1, such as the construction of the electrodes and connections to the power source are the same in FIG. 7 as that shown in FIGS. 1A, 1D and 1E. The embodiment of FIG. 7 differs from that of FIG. 2 in that, instead of employing a flat reflective layer 6, reflective plate 55 is employed where the surface of plate 55 facing the tubes 4' have a number of curved grooves 56 whose concave surfaces face tubes 4'. The grooves 56 may be parabolic in shape although curved surfaces of other shapes may also be usable. As shown in FIG. 7, each tube 4' has a corresponding groove where the axis of its corresponding groove lies substantially on a plane P which is normal to the front surface 80 of the plate. Surfaces of grooves 56 are coated with a reflective layer 56' such as aluminum film which reflects light generated by the fluorescent layer 5 towards front surface 80 of the plate. With the above-described construction, a much higher percentage of light generated by the fluorescent layer 5 is caused to be transmitted towards front surface 80 and used for forming images after passing through the light valve device as compared with that possible with the embodiment of FIG. 2. This greatly increases the efficiency of the back light source.

2. FIG. 8 is a cross-sectional view of a portion of plate 1 of FIG. 1A taken along the line X—X to illustrate another different construction. As in FIG. 7, tubes 4' with fluorescent layers 5 therein are again spaced apart from each other as shown. The back reflective plate 59 also has grooves therein whose concave surfaces face tubes 4'. However, the number of grooves are doubled that of the number of tubes 4'. Adjacent grooves meets at a ridge 60 whose cross-section is cusp-shaped as shown in FIG. 8. As also shown in FIG. 8, every other ridge 60 and the axes of the corresponding tube 4' lie on a plane, such as plane 82 which is normal to the front surface 80 of plate 1. The grooves are again coated with a highly reflective layer such as aluminum film 61. In this manner, light generated by the fluorescent layers 5 traveling backwards toward the reflector plate 59 along paths 62 are reflected by the reflective layer 61 towards the front surface 80 as shown in FIG. 8. This again greatly increases the percentage of light generated by layers 5 that are utilized in the back light source for generating images.

3. FIG. 9 illustrates yet another different construction of plate 1. The construction of FIG. 9 is similar to that of FIG. 7. The construction of FIG. 9 differs from that of FIG. 7 in that the lower half of tubes 4''' are wedge-shaped instead of hemispherical to further increase the percentage of light that can be reflected by the reflective layer 56' towards the front surface 80.

4. In the embodiments of FIGS. 7-9, the efficiency is increased by retaining separations between adjacent tubes. Such design reduces the maximum brightness that can be achieved. Furthermore, in order to achieve uniformity and brightness, either the tubes must be made very small or any diffuser plate employed should be spaced apart from the tubes which result in an increase in the thickness of the plate 1 that is undesirable. Therefore, the designs of FIGS. 7-9 may be suitable only for the construction of a single color light source.

In order to achieve a back light source of adequate maximum brightness as well as high efficiency, the design of FIG. 10A may be advantageous. Instead of employing tubes as shown in the embodiments described above, the back light source of FIG. 10A employs a front plate portion 65 and a back plate portion 66.

FIG. 10A is an enlarged cross-sectional view of a portion of plate 1 of FIG. 1A taken along the line X—X illustrating another construction of the plate whereby increased maximum brightness as well as high efficiency can be achieved for single color or multi-color display. As shown in FIG. 10A, the chambers 4 are enclosed between and defined by a front plate portion 65 and a back plate portion 66 where the front portion is closer to the light valve device (not shown) than the back portion. The front portion 65 has grooves 67 thereon and back portion has grooves 69 thereon facing grooves 67 where each groove 67 in the front portion matches in dimensions with a groove 69 in the back portion, so that each groove in the front portion and the matching groove in the back portion form a corresponding pair and form a chamber 4 when the two portions are abutting each other with each pair of corresponding grooves aligned with each other as shown in FIG. 10A. Thus, if the grooves are in the shape of half cylindrical depressions, then the matching grooves in the corresponding pair would have the same diameter and axis when each pair of corresponding grooves is aligned with each other with the two portions abutting each other in the manner shown in FIG. 10A. Grooves 67 are each coated with a fluorescent layer 68 and grooves 69 are each coated with reflective layer 70 instead of a fluorescent layer. Reflective layer 70 reflects light propagating backwards such as along paths 71 so that such light would propagate towards the front surface 80 and towards the light valve device; such reflective layer also reflects ultraviolet light generated such as along paths 72 towards the fluorescent layer 68 to further increase the light generating efficiency. Light reflective layer 70 may be an aluminum film which is effective in reflecting both visible and ultraviolet light. Any two adjacent grooves of each of the front and back portions 65, 66 are separated by a separating wall W having a smooth end surface that is substantially planar. The smooth end surfaces of the separating walls W shown more clearly in FIG. 10B. FIG. 10B is an partially enlarged and exploded view of the plate 1 illustrated in FIG. 10A, but where the front and back plate portions 65, 66 are spaced apart to show the smooth end surfaces S of separating walls W. As also illustrated in FIG. 10B, the plurality of surfaces S are preferably coplanar, so that when the two portions 65, 66 are aligned with corresponding end surfaces S abutting each other, each of the chambers 4 will be isolated from adjacent chambers. This is shown in FIG. 10A. When the grooves are aligned so that corresponding pairs of grooves are in matching positions as shown in FIG. 10A, each separating wall of the front plate portion 65 or back plate portion 66 will be matched in position and aligned with a corresponding separating wall of the other plate portion and the end surface of such wall will abut the end surface of the corresponding separating wall of the other portion. Upon evacuation of the chambers 4, atmospheric pressure will force the two plate portions 65, 66 together so that the end surface of each separating wall W will abut the end surface of the corresponding separating wall of the other plate portion, thereby isolating each chamber from adjacent chambers despite electron bombardment. Low-melting point glass may be used to seal the end surfaces of corresponding separating walls together to further insure that each chamber is isolated from adjacent chambers despite electron bombardment.

FIG. 11 is an enlarged, cross-sectional view of a portion of plate 1 taken along the line X—X in FIG. 1A to illustrate another construction of the plate whereby one portion of the plate is a diffuser plate to improve uniformity of light emission over the entire area of the plate facing the light valve device. As shown in FIG. 11, the plate 1 includes tubes 4' and reflective plate 55 with a reflective layer 56' thereon as in FIG. 7. As described above in reference to FIG. 7, the axes of each tube 4' and the axis of the corresponding groove 56 of the reflective plate lie on the same plane P which is perpendicular to front surface 80 (77 in FIG. 11). In addition to the above-described common features between FIGS. 7 and 11, the embodiment of FIG. 11 also includes a front plate portion 75 which is a diffuser plate to render the spatial distribution of light emitted by the plate more uniform. The surface of plate 75 close to tubes 4' has grooves 76 thereon where each of the grooves matches with and corresponds to a tube 4' and groove 56 as shown in FIG. 11, where the axis of each groove 76 lies together with the axes of its corresponding tube 4' and groove 56 on a plane P perpendicular to surface 77 of plate portion 75 facing the light valve device (not shown in FIG. 11). With grooves 76, plate portion 75 functions as a spatial sequence of diffuser lenses which reduces the internal reflections of light within plate 1 and increases the percentage of light that is transmitted to the light valve device to increase light generating efficiency.

The back light source of this invention has the advantages of the light source described in the priority application, Chinese Application Serial No. 92111225.4 as well as additional advantages such as enhanced light generating efficiency, simplified structure, high reliability, add ease of manufacture.

The invention has been described above by reference to various embodiments to illustrate the invention. However, various modifications and changes may be made to the embodiment without departing from the scope of the invention which is to be defined only by the appended claims.

What is claimed is:

1. A backlight source for use with a light valve display, comprising:
   a plate defining therein an array of substantially parallel elongated gas-discharge chambers each having an end, and defining therein a transverse chamber, wherein the end of each chamber is connected to the ends of the other chambers through the transverse chamber;
   a gas in the chambers;
   an electrode in each chamber spaced apart from the end of such chamber; and
   a power supply applying electrical potentials to the electrodes in sets of chambers during a plurality of consecutive time intervals in a sequential scanning operation, wherein the application of potentials to a set of chambers by said power supply defines scanning of the chambers in such set, each set of chambers including at least two chambers, said potentials being applied to electrodes in a set of a plurality of chambers during each time interval, each potential applied across the electrodes in two chambers in a set to cause gas discharge in the two chambers and in a portion of the transverse chamber connecting the two chambers so as to cause light emission from the two chambers, said power supply means being such that during at least two consecutive time intervals, the two sets of chambers to which electrical potentials are applied overlap by at least one chamber, so that ionized particles generated during the earlier of the two consecutive intervals in the at least one overlapping chamber accelerates gas discharge during the later of the two consecutive time intervals.

2. The source of claim 1, said plate being such that the elongated chambers have circular or elliptical cross-sections.

3. The source of claim 1, said plate having a front portion and a back portion separated by the chambers, said front portion being closer to the display than the back portion, said front portion being transparent and the back portion comprising a layer of light reflective material.

4. The source of claim 3, said reflective layer including aluminum metal.

5. The source of claim 1, further comprising means for heating said electrodes to cause the electrodes to emit electrons.

6. The source of claim 1, said electrodes being of cold cathode type.

7. The source of claim 1, said transverse chamber being elongated in a direction transverse to the array of chambers, said transverse chamber having a quadrilateral cross-section.

8. The source of claim 1, said chambers having walls, said plate further comprising first layers of fluorescent material on said walls.

9. The source of claim 8, wherein said first layers emit white light or light of a single color other than white.

10. The source of claim 8, said array forming a spatial sequence of chambers having a beginning chamber and an end chamber, wherein each of said first layers on the walls of the sequence of chambers emits red, green or blue light, and wherein the first layers on the walls of said sequence of chambers are such that when caused to emit light, color of light emitted by the first layers from different chambers along the spatial sequence of chambers changes alternately by one or more chambers from red to green to blue or from red to blue to green from the beginning chamber to the end chamber, said light emitted by the layers passing through the light valve display to form a multi-color or full color image.

11. The source of claim 10, said source having 3 m chambers, wherein a first subsequence formed by the first, fourth, seventh, . . . , (3m-2)th chambers emit light of a first color, said first subsequence being scanned by the power supply in a first subcycle, a second subsequence formed by the second, fifth, eight, . . . , (3m-1)th chambers emit light of a second color different from the first color, said second subsequence being scanned by the power supply in a second subcycle after the first subcycle, and a third subsequence formed by the third, sixth, ninth, . . . , 3mth chambers emit light of a third color different from the first and the second colors, said third subsequence being scanned by the power supply in a third subcycle after the second subcycle, wherein said power supply is such that for each time interval except the first in any subcycle, the chambers in the set scanned during the interval are shifted by one chamber in the same subsequence compared to the set of chambers scanned during the immediately preceding time interval in the same subcycle.

12. The source of claim 11, said plate further comprising second filter layers, each second filter layer interposed between a corresponding first fluorescent layer on the wall of one of the chambers and the light valve display, wherein each second layer has a pass band that passes light of the color emitted by its corresponding first fluorescent layer to improve color purity of images displayed, to shield the light valve display from ultraviolet light or to modify color coordinates of the images displayed.

13. The source of claim 1, wherein gas discharge in said chambers causes the gas in the chambers to emit ultraviolet radiation, wherein said plate includes one or more layers of fluorescent material that emits visible light of a single or multiple colors in response to said ultraviolet radiation.

14. The source of claim 13, wherein at least one of the portions of said transverse chamber connecting two chambers in the array has dimensions larger than the cross-sectional dimensions of such two chambers to reduce the density of charged particles present in the transverse chamber so as to reduce crosstalk.

15. The source of claim 1, wherein gas discharge in the chambers cause the chambers to emit light of the same color, wherein every pair of two adjacent chambers form a fluorescent lamp so that the gas discharge in each lamp causes light to be emitted from the two chambers of such lamp, and wherein the power supply applies the potentials to electrodes in the sets of chambers such that during each time interval except the first, the chambers in the set scanned are shifted by one chamber compared to the set scanned during the immediately preceding time interval.

16. The source of claim 15, said plate having n chambers from the first through the nth chamber, n being an integer greater than three, wherein each of the sets of chambers include three chambers, so that a first set includes the first through the third chambers, the second set the second through the fourth chamber, the (n-1)th set the (n-1)th, the nth and the first chamber, and the nth set the nth, the first and the second chamber, wherein the power supply applies potentials sequentially to electrodes in the first through the nth sets of chambers and then repeats the sequence during the consecutive time intervals.

17. The source of claim 1, wherein gas discharge in the chambers cause the chambers to emit light of different colors, the power supply scanning the chambers such that the chambers in each set emit light of the same color in each time interval, such that the sets of chambers are scanned to emit alternately light of different colors, and such that, during at least one time interval and its immediately preceding time interval, the chambers scanned emit light of the same color, and such that the chambers in the set scanned in such at least one time interval are shifted by one chamber compared to the chambers in the set scanned in the immediately preceding time interval.

18. The source of claim 1, wherein the numbers of chambers in the sets are even so that each set includes one or more pairs of adjacent chambers, said power supply applying an AC potential across electrodes in each pair of adjacent chambers such that substantially the same potential is applied to the electrodes in two adjacent chambers that are in different pairs to reduce unevenness of light emission.

19. The source of claim 18, wherein said AC potential is a square wave or sine wave.

20. The source of claim 18, wherein said same potential applied to electrodes in adjacent chambers of different pairs is an AC potential or a fixed potential.

21. The source of claim 1, said plate comprising an array of glass tubes, wherein each of said chambers is defined by and enclosed within a tube.

22. The source of claim 21, each of said tubes formed by a glass material that has a predetermined color, said tubes formed by glass material of two or more colors, so that said glass tubes will filter out light outside predetermined pass bands.

23. The source of claim 21, wherein said tubes in the array of tubes are located with predetermined spacings between adjacent tubes, said plate further comprising a reflector surface on the side of the plate opposite to that of the light valve display to reflect light emitted from the chambers towards the display to increase efficiency of the source.

24. The source of claim 23, wherein said reflector surface being in the shape of a spatial sequence of grooves having curved surfaces with their concave sides facing the chambers, each two adjacent curved surfaces being joined at a cusp.

25. The source of claim 24, said plate having a front surface facing the light valve display, said tubes having axes, said spatial sequence of grooves being such that every other cusp between curved surfaces of adjacent grooves lies subtantially in a plane passing an axis of a tube, said plane being substantially perpendicular to the front surface of the plate.

26. The source of claim 24, said plate having a front surface facing the light valve display, said tubes having axes, said grooves each having an axis, said grooves being such that the axis of each groove lies subtantially in a plane passing through an axis of a tube, said plane being substantially perpendicular to the front surface of the plate.

27. The source of claim 24, said grooves having cross-sections that are parabolic.

28. The source of claim 23, said plate having a front portion and a back portion separated by the tubes, said front portion being closer to the display than the back portion, said tubes having portions facing the back portion that are wedge-shaped in cross-section to increase the amount of light reflected by the reflector surface that can reach the display.

29. The source of claim 1, said plate having a front portion and a back portion, said front portion being closer to the display than the back portion, wherein each of the two portions has grooves with matching grooves in the other portion, so that each groove in the front portion and its matching groove in the back portion form a corresponding pair and form a chamber when the portions are abutting each other with each pair of corresponding grooves aligned with each other.

30. The source of claim 29, said plate further comprising fluorescent layers on surfaces of the grooves on the front portion and reflecting layers on surfaces of the grooves of the back portion.

31. The source of claim 30, wherein said reflecting layers include aluminum metal.

32. The source of claim 29, said plate further comprising low-melting point glass sealing the two portions together to isolate each chamber from adjacent chambers despite electron bombardment.

33. The source of claim 29, wherein adjacent grooves of each of the two portions are separated by a wall, wherein the separating walls of each portion have smooth end surfaces that are substantially coplanar, so that when the portions are abutting each other with each pair of corresponding grooves aligned with each other, the end surface of each separating wall of a portion will abut an end surface of a corresponding separating of the other portion, said abutting surfaces being forced towards each other by atmospheric pressure upon evacuation of the chambers to isolate each chamber from adjacent chambers despite electron bombardment.

34. A backlight source for use with a light valve display, comprising:
an array of substantially parallel elongated gas-discharge chambers each having an end, and defining therein a transverse chamber, wherein the end of each chamber is connected to and communicates with the ends of the other chambers through the transverse chamber;
a gas in the chambers;
an electrode in each chamber spaced apart from the end of such chamber; and
means for applying electrical potentials to the electrodes in sets of chambers during a plurality of consecutive time intervals in a sequential scanning operation so that ionized particles generated during at least one time interval accelerates gas discharge during a subsequent time interval, causing different sets of chambers to emit light successively for displaying images.

35. The source of claim 34, further comprising a transparent diffuser plate between the chambers and the display, said plate having grooves therein, each groove aligned with a corresponding chamber, so that light from the chambers are distributed more evenly upon reaching the display.

36. The source of claim 35, said plate having a flat diffusive surface facing the display, wherein the grooves and chambers each has an axis, wherein the axis of each chamber and the axis of its corresponding groove lie substantially on a plane perpendicular to the flat surface of the plate.

37. A method for providing backlight for a light valve display using a backlight source, said source comprising:
(a) a plate defining therein an array of substantially parallel elongated gas-discharge chambers each having an end, and defining therein a transverse chamber, wherein the end of each chamber is connected to the ends of the other chambers through the transverse chamber, said chambers containing a gas;
(b) an electrode in each chamber spaced apart from the end of such chamber; said method comprising the steps of:
applying electrical potentials to the electrodes in sets of chambers during a plurality of consecutive time intervals in a sequential scanning operation, wherein the application of potentials to a set of chambers by said applying step defines scanning of the chambers in such set, each set of chambers including at least two chambers, said potentials being applied to electrodes in a set of a plurality of chambers during each time interval, each potential applied across the electrodes in two chambers in a set to cause gas discharge in the two chambers and in a portion of the transverse chamber connecting the two chambers so as to cause light emission from the two chambers, said applying step being such that during at least two consecutive time intervals, the two sets of chambers to which electrical potentials are applied overlap by at least one chamber, so that ionized particles generated during the earlier of the two consecutive intervals in the at least one overlapping chamber accelerates gas discharge during the later of the two consecutive time intervals.

* * * * *